US010200345B2

(12) United States Patent
Harjanto (10) Patent No.: US 10,200,345 B2
(45) Date of Patent: Feb. 5, 2019

(54) ELECTRONIC MAIL SENDER VERIFICATION

(71) Applicant: Uniloc Luxembourg S.A., Luxembourg (LU)

(72) Inventor: Dono Harjanto, Irvine, CA (US)

(73) Assignee: Uniloc 2017 LLC, Wilmington, DE (US)

( * ) Notice: Subject to any disclaimer, the term of this patent is extended or adjusted under 35 U.S.C. 154(b) by 544 days.

(21) Appl. No.: 14/524,939

(22) Filed: Oct. 27, 2014

(65) Prior Publication Data

US 2015/0121075 A1    Apr. 30, 2015

Related U.S. Application Data

(60) Provisional application No. 61/896,890, filed on Oct. 29, 2013.

(51) Int. Cl.
*H04L 9/32* (2006.01)
*H04L 29/06* (2006.01)
*H04L 12/58* (2006.01)

(52) U.S. Cl.
CPC .......... *H04L 63/0428* (2013.01); *H04L 51/00* (2013.01); *H04L 63/126* (2013.01); *H04L 63/1483* (2013.01); *H04L 51/08* (2013.01); *H04L 51/30* (2013.01)

(58) Field of Classification Search
USPC ................................................. 713/168, 176
See application file for complete search history.

(56) References Cited

U.S. PATENT DOCUMENTS

| 4,120,030 A | 10/1978 | Johnstone |
| 5,155,847 A | 10/1992 | Kirouac et al. |
| 5,416,840 A | 5/1995 | Cane et al. |
| 5,440,635 A | 8/1995 | Bellovin et al. |
| 5,970,143 A | 10/1999 | Schneier et al. |

(Continued)

FOREIGN PATENT DOCUMENTS

| EP | 1 637 961 | 3/2006 |
| WO | WO 2008/034900 | 3/2008 |
| WO | WO 2009/039504 | 3/2009 |

OTHER PUBLICATIONS

Jeges et al., "Watermarking Software to Signal Copy Protection," *Computer Network Security: Communications in Computer and Information Science*, 2007, vol. 1, Part 7, Part 12, pp. 408-413.

(Continued)

*Primary Examiner* — Jeffrey C Pwu
*Assistant Examiner* — Samuel Ambaye
(74) *Attorney, Agent, or Firm* — Sean D. Burdick (57) ABSTRACT

An e-mail server decrypts attachments of an e-mail message with a key associated with a sending device such that failure of the decryption indicates the e-mail message can be harmful. The sending device inserts its device identifier into the e-mail message as a header and uses an encryption key associated with the device identifier and a digital fingerprint of the sending device to encrypt all attachments of the e-mail message. The delivering e-mail server processes the e-mail message. If the e-mail message contains no identifier, if no key is associated with the parsed identifier, or if attempted encryption fails, the e-mail server determines that the e-mail message is potentially harmful and disarms the e-mail message.

12 Claims, 7 Drawing Sheets

(56) References Cited

U.S. PATENT DOCUMENTS

| | | | |
|---|---|---|---|
| 6,006,328 A | 12/1999 | Drake | |
| 6,009,525 A | 12/1999 | Horstmann | |
| 6,330,670 B1 | 12/2001 | England et al. | |
| 6,484,182 B1 | 11/2002 | Dunphy et al. | |
| 6,747,930 B1 | 6/2004 | Weldon et al. | |
| 6,968,458 B1 * | 11/2005 | Ruddle | H04L 63/0442 |
| | | | 713/168 |
| 7,051,211 B1 | 5/2006 | Matyas, Jr. et al. | |
| 7,263,606 B2 | 8/2007 | Elteto | |
| 7,287,166 B1 | 10/2007 | Chang et al. | |
| 7,328,453 B2 | 2/2008 | Merkle et al. | |
| 8,009,831 B2 | 8/2011 | Chou et al. | |
| 8,010,804 B2 | 8/2011 | Murase et al. | |
| 8,474,038 B1 | 6/2013 | Wong | |
| 2001/0034846 A1 | 10/2001 | Beery | |
| 2002/0144153 A1 | 10/2002 | LeVine et al. | |
| 2002/0152392 A1 | 10/2002 | Hardy et al. | |
| 2003/0159044 A1 | 8/2003 | Doyle et al. | |
| 2003/0191938 A1 | 10/2003 | Woods et al. | |
| 2004/0083469 A1 | 4/2004 | Chen et al. | |
| 2004/0125954 A1 | 7/2004 | Riebe et al. | |
| 2004/0148601 A1 | 7/2004 | Kroening | |
| 2004/0215661 A1 | 10/2004 | Zhang et al. | |
| 2005/0004954 A1 | 1/2005 | Soule, III | |
| 2005/0132070 A1 | 6/2005 | Redlich et al. | |
| 2005/0172280 A1 | 8/2005 | Ziegler et al. | |
| 2005/0188214 A1 | 8/2005 | Worley et al. | |
| 2007/0220500 A1 | 9/2007 | Saunier | |
| 2007/0277037 A1 | 11/2007 | Langer et al. | |
| 2008/0165972 A1 * | 7/2008 | Worthington | H04L 63/06 |
| | | | 380/278 |
| 2008/0263366 A1 | 10/2008 | G | |
| 2009/0077390 A1 | 3/2009 | Cobelo et al. | |
| 2009/0083730 A1 | 3/2009 | Richardson | |
| 2009/0204661 A1 | 8/2009 | Endo et al. | |
| 2009/0249492 A1 | 10/2009 | Boesgaard Sorensen | |
| 2009/0328227 A1 | 12/2009 | Cook et al. | |
| 2010/0037062 A1 | 2/2010 | Carney | |
| 2011/0167498 A1 | 7/2011 | Wilson | |
| 2012/0204032 A1 * | 8/2012 | Wilkins | H04L 9/006 |
| | | | 713/170 |

OTHER PUBLICATIONS

The Linux Information Project, "Hidden File Definition," Jul. 21, 2006.

Williams, R., "A Painless Guide to CRC Error Detection Algorithms," Aug. 13, 1993, 33 pages, www.ross.net/crc/download/crc_v3.txt.

* cited by examiner

ELECTRONIC MAIL SENDER VERIFICATION

This application claims priority to U.S. Provisional No. 61/896,890, filed Oct. 29, 2013, which is fully incorporated herein by reference.

BACKGROUND OF THE INVENTION

1. Field of the Invention

The present invention relates generally to network-based computer security and, more particularly, methods of and systems for authenticating a sender of electronic mail through a computer network.

2. Description of the Related Art

Security of computer networks is under constant attack by those who would cause damage or gain value improperly. Often, attacks are designed to gain information that is useful for further attacks. Some such attacks are designed exploit a long-known weakness in computer security associated with the acronym, PICNIC (Problem In Chair, Not In Computer). In other words, these attacks seek to fool human users, typically by masquerading as a trusted party. Such attacks are known by the term, "phishing", as in fishing for additional vulnerabilities.

A common phishing attack is to send an e-mail in which the sender information of the e-mail is spoofed to appear trustworthy to the recipient. For example, if the e-mail is to be sent to someone at the address, "jenny.smith@company.com", the e-mail header can be manipulated to make the e-mail appear to come from someone who works at the same company as the recipient address, for example, "bob.jones@company.com". Even worse, a successful phishing attack can provide the attacker with e-mail addresses of people known to one another to make subsequent e-mail messages appear to come from people personally known to each recipient.

The e-mail message itself often attempts to prompt the recipient to voluntarily, albeit unwittingly, grant access to the attacker. For example, the e-mail may contain an attachment that is a program, execution of which grants the attacker access to the recipient's computer. The program can be disguised. For example, the Windows® operating system of Microsoft Corporation of Redmond, Wash., uses a file type at the end of a file name to identify the nature of the file but hides the type from users. Accordingly, an attachment named "cutecat.jpg.exe" can identify a program (with the ".exe" type designation) that appears to be a simple, harmless image (with the ".jpg" ending visible to the user as an apparent type designation).

Educating users to be wary of such attacks can only prevent so many attacks. Even sophisticated users can make a mistake when sorting through numerous e-mail messages day after day. What is needed is a way to automatically identify and disarm inauthentic e-mail messages.

SUMMARY OF THE INVENTION

In accordance with the present invention, an e-mail server decrypts attachments of an e-mail message with a key associated with a sending device such that failure of the decryption indicates the e-mail message can be harmful. The sending device inserts its device identifier into the e-mail message as a header and uses an encryption key associated with the device identifier and a digital fingerprint of the sending device to encrypt all attachments of the e-mail message.

Prior to delivering the e-mail message, the e-mail server determines whether the e-mail message purports to originate from a domain managed by the e-mail server. If so, the e-mail server parses the sending device's identifier from the e-mail message and attempts to decrypt the attachments of the e-mail message using an encryption key associated with the identifier. If the e-mail message contains no identifier in its headers, if no encryption key is associated with the parsed identifier, or the attempted decryption fails, the e-mail server determines that the e-mail message is potentially harmful and disarms the e-mail message.

The e-mail server disarms the e-mail message by adding a header to the e-mail message that identifies the e-mail message as potentially harmful and stripping all attachments from the e-mail message.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

FIG. 6 is a block diagram of a log of message metadata to be used for authentication of the device of FIG. 1.

DETAILED DESCRIPTION

In accordance with the present invention, an e-mail server 106 (FIG. 1) decrypts attachments of an e-mail message with a key associated with a sending device 102A such that failure of the decryption indicates the e-mail message can be harmful. E-mail server 106 also disarms any potentially harmful e-mail messages in a manner described below.

Figure 1:
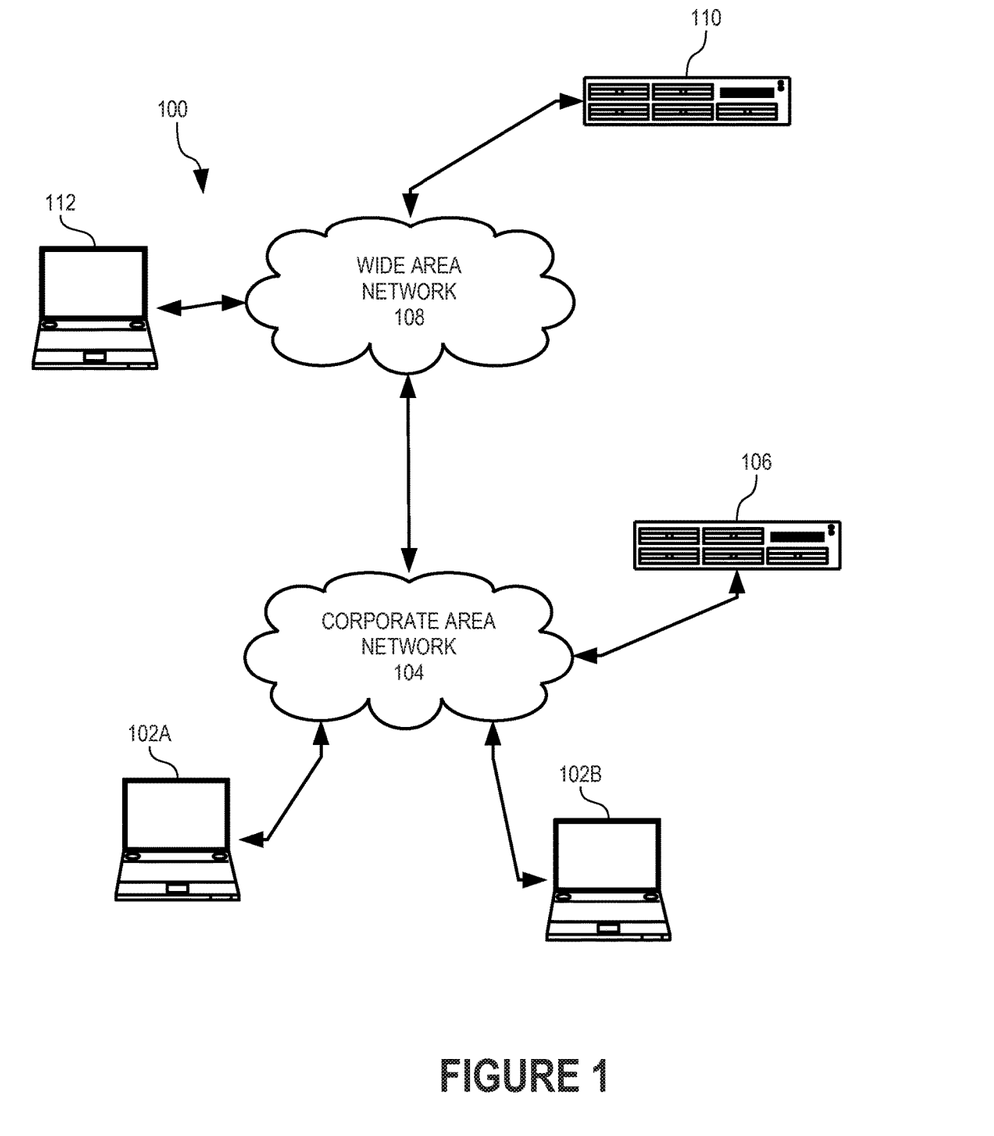
FIG. 1 is a diagram showing an e-mail server and client devices coupled to one another through a corporate area network and that cooperate to verify senders of e-mail messages in accordance with one embodiment of the present invention.

E-mail server 106 is connected to one or more client devices 102A-B through a corporate area network 104. In addition, corporate area network 104 is connected to a wide area network 108, which is the Internet in this illustrative embodiment, and therethrough to numerous other devices such as client device 112 and e-mail server 110.

Figure 2:
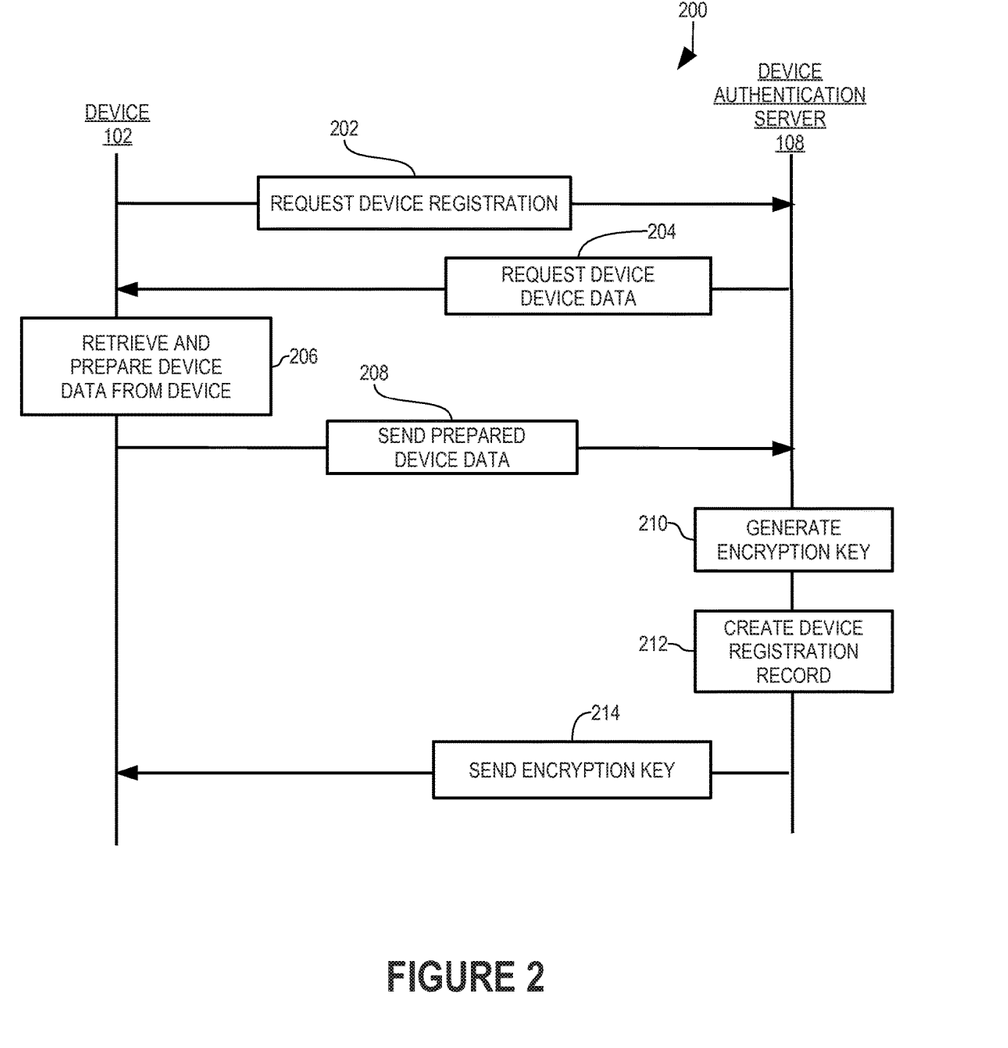
FIG. 2 is a transaction flow diagram illustrating the manner in which the device is registered with the e-mail server for subsequent sender verification.

Client device 112 can be used (i) by a legitimate user of e-mail server 106 or (ii) by an unscrupulous person using e-mail server 110 but spoofing header information to make an e-mail message appear to come from a legitimate user of e-mail server 106. To facilitate distinction between the two, e-mail server 106 requires registration of devices that are authorized to use e-mail server 106 for mail submission services. Such registration in the illustrative example of device 102A is illustrated in transaction flow diagram 200 (FIG. 2).

In step 202, device 102A sends a request for registration to e-mail server 106. The request can be in the form of a URL specified by the user of device 102A using mail user agent logic 1020 (FIG. 10) executing in device 102A and conventional user interface techniques involving physical manipulation of user input devices 1008. Mail user agent logic 1020 and user input devices 1008 and other components of device 102A are described in greater detail below.

In step 204 (FIG. 2), e-mail server 106 sends a request to device 102A for device attributes of device 102. The request includes content that causes device 102A to gather attribute data representing hardware and other configuration attributes of device 102A to form a digital fingerprint 1042 (FIG. 10) of device 102A. The registration and use of digital fingerprints is described, for example, in U.S. Pat. Nos. 8,213,907; 8,239,852; and 8,316,421, and those descriptions are incorporated herein by reference.

In step 206 (FIG. 2), device 102A executes the content received in step 204 to generate digital fingerprint 1042 (FIG. 10) from various component and configuration attributes of device 102A.

In step 208 (FIG. 2), device 102A sends the digital fingerprint generated in step 206 to e-mail server 106.

In step 210, device authentication logic 920 (FIG. 9) of e-mail server 106 generates an encryption key from the received digital fingerprint. The encryption key can be the digital fingerprint itself or a hash thereof as examples.

Figure 7:
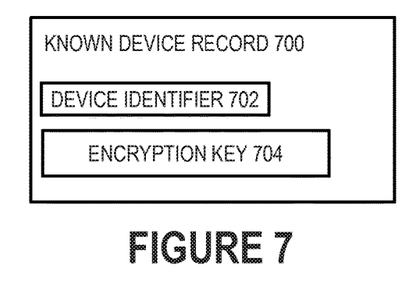
FIG. 7 is a block diagram of a known device record used by the e-mail server to verify senders of e-mail messages.

In step 212 (FIG. 2), device authentication logic 920 (FIG. 9) of e-mail server 106 creates a device registration record for device 102A from the received digital fingerprint. E-mail server 106 creates a device registration record in the form of known device record 700 (FIG. 7) for device 102A by creating a globally unique identifier for device 102A, or using an identifier for device 102A created in the generation of the digital fingerprint, and storing the identifier of device 102A as device identifier 702 (FIG. 7). In addition, e-mail server 106 stores the encryption key generated in step 210 as encryption key 704.

In step 214 (FIG. 2), e-mail server 106 sends a report of successful registration to device 102A, providing device identifier 702 (FIG. 7) of device 102A for subsequent identification, particularly if it differs from the one generated by device 102A. The report also includes encryption key 704 if it differs from digital fingerprint 1042 or cannot be derived by device 102A from digital fingerprint 1042. After step 214 (FIG. 2), processing according to transaction flow diagram 200 completes and device 102A is registered for subsequent sender verification with e-mail server 106.

Logic flow diagram 300 (FIG. 3) illustrates the creation and sending of an e-mail message in a manner that facilitates sender verification by e-mail server 106.

Figure 3:
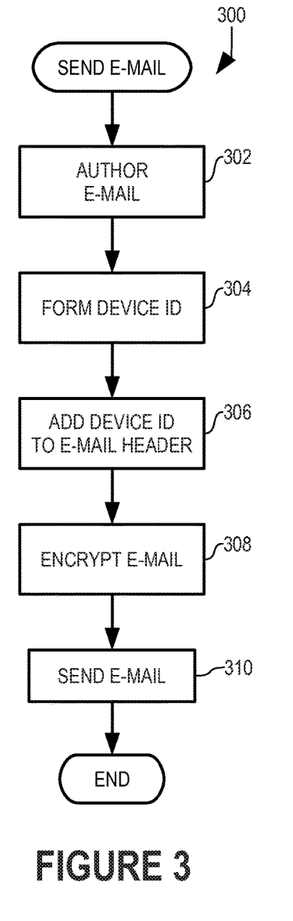
FIG. 3 is a logic flow diagram illustrating the manner in which the device creates an e-mail message for which the sender can be verified by the e-mail server of FIG. 1.

In step 302, device 102A authors an e-mail message using mail user agent logic 1020. Mail user agent logic 1020 is logic through which a user of device 102A can author, send, receive, and display e-mail messages. Examples of conventional mail user agents include the Thunderbird® mail user agent available from the Mozilla® Foundation and the Outlook® mail user agent available from Microsoft® Corporation. Mail user agent logic 1020 is configured, directly or by use with one or more of MUA plug-ins 1022, to behave in the manner described herein.

The user authors the e-mail message through physical manipulation of one or more of user input devices 1008 to generate signals which are in turn used by mail user agent logic 1020 to form data representing the e-mail message. The authoring of the e-mail message can be conventional.

In step 304 (FIG. 3), mail user agent logic 1020 forms a device identifier for device 102A. The device identifier can be part of digital fingerprint 1042 and retrieved therefrom.

In step 306 (FIG. 3), mail user agent logic 1020 adds the device identifier to the e-mail message as a header. E-mail messages that comport with standards such as the SMTP (Simple Mail Transport Protocol) include headers as plain text. Accordingly, adding the device identifier of device 102A to the header is as simple as adding a single line of plain text to the e-mail message. The device identifier can also be included in the e-mail message in other ways to conform to e-mail protocols in which headers are not so easily added. For example, the device identifier can be injected into the message body in a format in which the device identifier can be recognized and parsed from the body or can be added as an attachment.

In step 308 (FIG. 3), mail user agent logic 1020 encrypts the e-mail message. In particular, mail user agent logic 1020 retrieves an encryption key associated with the device identifier formed in step 304 and uses the encryption key to encrypt each and every attachment of the e-mail message.

Figure 4:
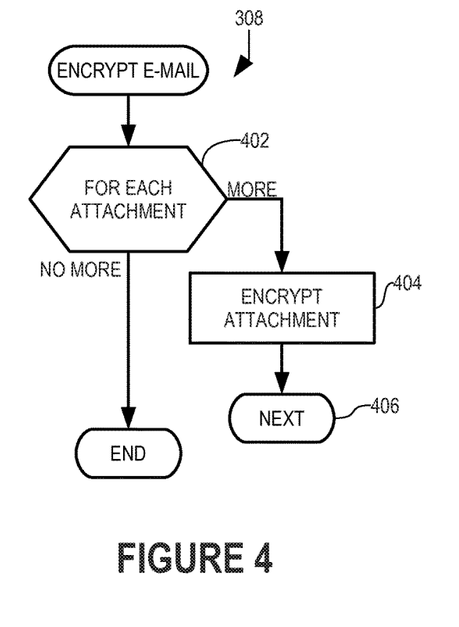
FIG. 4 is a logic flow diagram illustrating a step of the logic flow diagram of FIG. 3 in greater detail.

Step 308 is shown in greater detail as logic flow diagram 308 (FIG. 4). Loop step 402 and next step 406 define a loop in which mail user agent logic 1020 processes each attachment of the e-mail message according to step 404. In step 404, mail user agent logic 1020 encrypts the attachment using the encryption key.

Attachments are items of data added to the e-mail message according to the Multipurpose Internet Mail Extensions (MIME) standard. Each is delimited and encoded in the e-mail message as plain text and is considered a component of the e-mail message. To encrypt an attachment, mail user agent logic 1020 parses and removes data representing the attachment and replaces the data with data representing an encrypted form of the attachment.

While attachments are generally understood to exclude the text body of the e-mail message, many mail user agents in use today support a rich text format in which an otherwise plain text message can include rich text features such as italics, bold text, underlined text, and various fonts and font sizes. These features are supported by including a rich text (e.g., HTML—HyperText Markup Language) version of the body of the message as an attachment. Thus, in most modern mail user agents, the body of the e-mail message would also be encrypted according to logic flow diagram 308 (FIG. 4), and the e-mail message would therefore include at least one attachment even if the user had not manually attached a file to the e-mail message.

Once all attachments of the e-mail message have been processed according to the loop of steps 402-406, processing according to logic flow diagram 308, and therefore step 308 (FIG. 3), completes.

In step 310, mail user agent logic 1020 sends the e-mail message through an e-mail server, e.g., according to the SMTP. Thus, the e-mail message that is sent includes an identifier of the device from which the e-mail message originates and with all attachments encrypted using a key associated with the device identifier.

Once sent, the e-mail message is forwarded to the e-mail server of the recipient according to the SMTP. In this illustrative example, the intended recipient uses client device 102B and e-mail server 106 is the server to which the e-mail message is sent for delivery.

Figure 5:
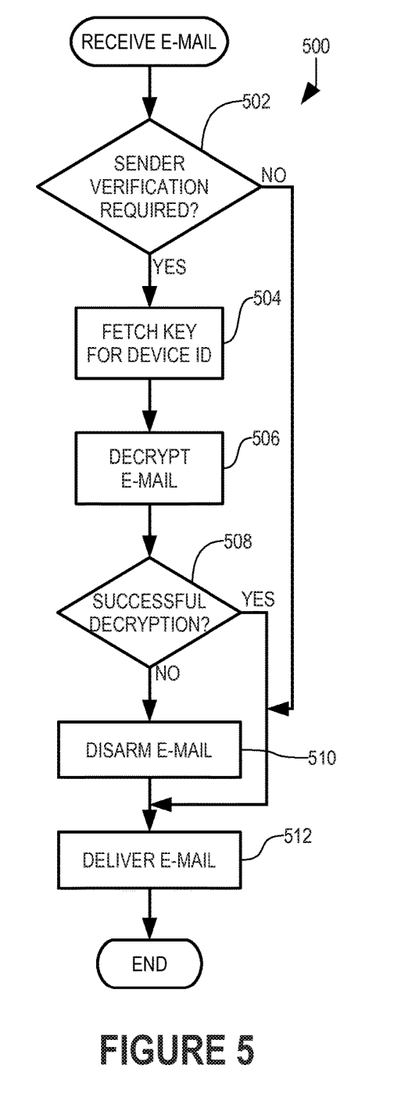
FIG. 5 is a logic flow diagram illustrating the manner in which the e-mail server verifies the sender of an e-mail message in accordance with the present invention.

Upon receipt of the e-mail message, e-mail server 106 processes the e-mail message to verify the sender of the e-mail in the manner illustrated by logic flow diagram 500 (FIG. 5). In this illustrative embodiment, the delivery of e-mail messages by e-mail server 106 is handled by mail delivery agent logic 924.

In test step 502, mail delivery agent logic 924 determines whether sender verification as described herein is required. In particular, mail delivery agent logic 924 determines whether the e-mail message includes a device identifier in the header as stored in step 306 (FIG. 3) as described above or whether the e-mail message purports to come from a sender served by e-mail server 106. Mail delivery agent logic 924 determines whether the e-mail message purports to come from a sender served by e-mail server 106 by determining whether the domain portion of the sender's e-mail address listed in the headers of the e-mail message identify e-mail server 106. For example, consider that e-mail server 106 is the e-mail server for all e-mail addresses with the "company.com" domain. Any e-mail message purporting to be sent from an e-mail address that ends in "@company.com" identifies e-mail server 106 as the sender's e-mail server.

If the e-mail message does not contain a device identifier in the headers and is not purported to come from a sender served by e-mail server 106, processing transfers to step 512 in which mail delivery agent logic 924 delivers the e-mail message. Mail delivery agent logic 924 delivers the e-mail message in accordance with any of a number of e-mail message delivery protocols, including IMAP and POP for example.

If the e-mail message contains a device identifier in the headers or is purported to come from a sender served by e-mail server 106, processing transfers to step 504. In step 504, mail delivery agent logic 924 fetches an encryption key associated with the device identifier of the e-mail message. If the e-mail message is purported to come from a sender served by e-mail server 106 but does not include a device identifier in the headers, mail delivery agent logic 924 fails to fetch an encryption key in step 504. In step 506, mail delivery agent logic 924 decrypts the e-mail message using the encryption key fetched in step 504, failing decryption if fetching of the encryption key failed.

Figure 6:
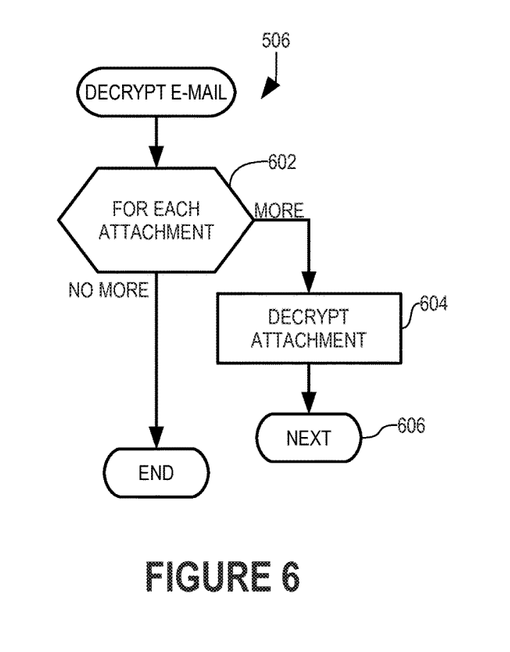
FIG. 6 is a logic flow diagram illustrating a step of the logic flow diagram of FIG. 5 in greater detail.

Step 506 is shown in greater detail as logic flow diagram 506 (FIG. 6). Loop step 602 and next step 606 define a loop in which mail delivery agent logic 924 processes each attachment of the e-mail message according to step 604. In step 604, mail delivery agent logic 924 decrypts the attachment using the encryption key.

Once all attachments of the e-mail message have been processed according to the loop of steps 602-606, processing according to logic flow diagram 506, and therefore step 506 (FIG. 5), completes. Process 500 then advances to step 508.

In test step 508, mail delivery agent logic 924 determines whether decryption in step 506 was successful. Decryption in step is successful if (i) an encryption key is successfully fetched in step 504 and (ii) decryption in step 506 using the fetched encryption key is successful.

If decryption in step 506 is successful, processing by mail delivery agent logic 924 transfers to step 512 and the e-mail message is delivered decrypted and without further modification. Thus, the e-mail message is delivered without modification only if the e-mail message is properly decrypted using an encryption key associated with a device identifier in the header of the e-mail message.

If decryption in step 506 is unsuccessful, processing by mail delivery agent logic 924 transfers to step 510. In step 510, mail delivery agent logic 924 disarms the e-mail message. In this illustrative embodiment, mail delivery agent logic 924 disarms the e-mail message by (i) adding a header that marks the e-mail message as potentially harmful and (ii) stripping the attachments from the e-mail message in such a manner that mail user agent logic 1020 of the recipient's device (e.g., client device 102B) does not automatically show the attachments to the user but otherwise makes the attachments available to a particularly sophisticated user.

As used herein, "stripping" of attachments of an e-mail message refers to rendering the attachments unavailable to the user by the ordinary manner of retrieving and displaying attachments. For example, the attachments can be removed and stored in a web server and replaced in the e-mail message with URLs by which the attachments can be retrieved and which are associated with warnings that the attachments are determined to be potentially harmful. Alternatively, the attachments can be removed entirely from the e-mail message. In addition, the attachments can be encrypted such that the user can decrypt the attachments with a telling passphrase such as "I know what I'm doing." Mail delivery agent logic 924 can also modify the body of the e-mail message to include instructions for decrypting the attachments along with a warning not to do so.

Once mail delivery agent logic 924 has disarmed the e-mail message in step 510, mail delivery agent logic 924 delivers the disarmed e-mail message in step 512.

It should be appreciated that phishing attacks that look like the attack is embedded in a plain text body of an e-mail message are typically embedded in an attachment to the e-mail message. For example, the e-mail message can include an HTML attachment that is displayed by mail user agent logic 1020 as the body of the e-mail message in a manner that appears to be a display of a plain text body of the e-mail message. A common type of phishing attack includes a link to a harmful web page but is disguised to appear to a trustworthy URL. For example, consider the fictitious HTML link "<a href=http://www.thievesrus.com/fakeaccount123ABC>https://www.trustworthybank.com/login.html</a>". The user will see the link, "https://www.trustworthybank.com/login.html", in a manner that looks as if the link were in plain text and recognized as a URL by mail user agent logic 1020. In reality, however, the link is to a completely different site, i.e., "http://www.thievesrus.com/fakeaccount123ABC".

This ruse requires that the body of the e-mail message be an HTML attachment to disguise the URL of the link. Accordingly, disarming the e-mail message in step 510 defeats this type of phishing attack as well, despite the attack appearing to be in a plain text body of the e-mail message.

E-mail server 106 enhances sender verification by tracking transaction identifiers used with each sender. As described above, mail user agent logic 1020 sends the e-mail message through an e-mail server, e.g., e-mail server 106, according to SMTP in step 310. In this illustrative embodiment, e-mail server 106 implements a secure, enhanced version of SMTP, i.e., ESMTPS (Enhanced Simple Mail Transport Protocol, Secure). Such uses a transaction identifier to identify the ESMTPS transaction by which mail user agent logic 1020 sends the e-mail message to e-mail server 106. The transaction identifier is recorded as a header in the e-mail message. The header identifies the sender (e.g., device 102A) and the recipient (e.g., e-mail server 106) in addition to the transaction identifier.

Figure 8:
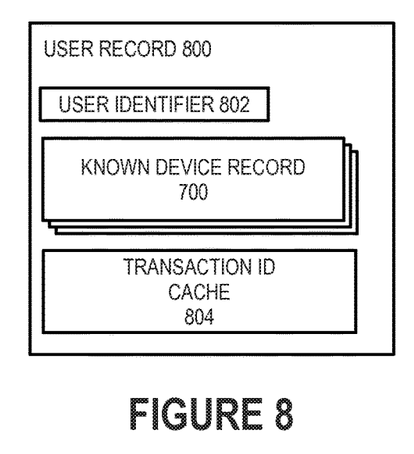
FIG. 8 is a block diagram of a user record used by the e-mail server to verify senders of e-mail messages.

When mail submission agent logic 922 (FIG. 9) of e-mail server 106 receives an e-mail message from a sender according to ESMTPS, mail submission agent logic 922 records the transaction identifier of that ESMTPS transaction in a transaction identifier cache 804 (FIG. 8) in a user record 800 of the sender. Sender identifier 802 uniquely identifies the user represented by user record 800 and is the sender's e-mail address in this illustrative embodiment. User record 800 also includes known device records, such as known device record 700, for each device used by the subject user to send e-mail messages.

Figure 11:
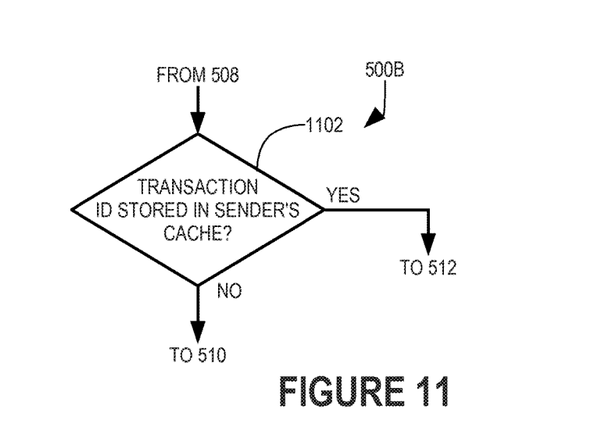
FIG. 11 is a logic flow diagram fragment illustrating an additional step to the logic flow diagram of FIG. 5.

Logic flow diagram fragment 500B (FIG. 11) shows a modification to logic flow diagram 500 (FIG. 5) in this illustrative embodiment in which the transaction identifier of an e-mail message is used by e-mail server 106 to enhance sender verification. Processing by e-mail server 106 transfers from test step 508 to test step 1102 (FIG. 11). In one embodiment, processing transfers to step 1102 when e-mail server 106 determines that decryption is successful in test step 508, thereby requiring sender verification by both (i) successful decryption and (ii) transaction identifier verification. In an alternative embodiment, processing transfers to step 1102 when e-mail server 106 determines that decryption is not successful in test step 508, thereby requiring sender verification by either (i) successful decryption or (ii) transaction identifier verification. In yet another alternative embodiment, processing transfers to step 1102 when e-mail server 106 determines that decryption is not successful in test step 508 because the e-mail message was not encrypted. In this third embodiment, transaction identifier verification is used by e-mail server 106 only when sender verification by e-mail encryption is not attempted. Such can be the case when an e-mail message contains no MIME attachments to be encrypted or when the sender uses a client device that is not yet registered according to transaction flow diagram 200 (FIG. 2) and fetching of the encryption key in step 504 (FIG. 5) fails.

In test step 1102 (FIG. 11), mail delivery agent logic 924 (FIG. 9) parses the initial ESMTPS identifier from the headers of the e-mail message and determines (i) whether the ESMTPS transaction involved e-mail server 106 and (ii) whether the parsed ESMTPS transaction identifier matches any transaction identifier stored in transaction identifier cache 804 for the sender of the e-mail message. Mail delivery agent logic 924 verifies the sender by transaction identifier when both (i) the ESMTPS transaction involved e-mail server 106 and (ii) the parsed ESMTPS transaction identifier matches any transaction identifier stored in transaction identifier cache 804 for the sender of the e-mail message. Otherwise, sender verification by transaction identifier fails.

If mail delivery agent logic 924 verifies the sender by transaction identifier in test step 1102 (FIG. 11), processing transfers to step 512 in which mail delivery agent logic 924 delivers the e-mail message in the manner described above. If sender verification by transaction identifier fails in test step 1102, processing transfers to step 510 in which mail delivery agent logic 924 disarms the e-mail in the manner described above.

As described above, device 112 (FIG. 1) can be used (i) by a legitimate user of e-mail server 106 or (ii) by an unscrupulous person using e-mail server 110 but spoofing header information to make an e-mail message appear to come from a legitimate user of e-mail server 106. Device 112 can also be used by a legitimate user of e-mail server 110 for e-mail services to send an e-mail message to a device whose e-mail services are provided by e-mail server 106.

In the illustrative example of device 112 sending an e-mail message in which sender's e-mail address is spoofed to be one managed by e-mail server 106, device 112 neither includes a device identifier in the e-mail address nor encrypts the e-mail message in the manner described above with respect to logic flow diagram 300 (FIG. 3). In addition, since e-mail server 106 was not the initial SMTP server for the e-mail message, the initial SMTP record in the headers of the e-mail message won't identify e-mail server 106 and the transaction identifier, if present, won't have been recorded in transaction identifier cache 804 for the purported sender of the e-mail message.

In attempting to deliver the e-mail message, e-mail server 106 determines that sender verification is required in test step 502 (FIG. 5) since the e-mail message purports to come from a sender served by e-mail server 106. Since the e-mail message includes no device identifier and no attachments are encrypted, decryption fails. In addition, sender verification by transaction identifier also fails. Accordingly, e-mail server 106 disarms the e-mail message in step 510.

In the illustrative example of device 112 (FIG. 1) in which device 112 is used by a sender that is served by e-mail server 106, device 112 includes a device identifier of device 112 and encrypts the e-mail message in the manner described above with respect to logic flow diagram 300 (FIG. 3). Device 112 sends the e-mail message according to SMTP through wide area network 108 and corporate area network 104 to e-mail server 106. E-mail server 106 processes the e-mail message in the manner described above with respect to processing an authentic e-mail message sent by device 102A.

In yet another embodiment, e-mail server 110 is an e-mail server that implements sender verification in the manner described above but independently of e-mail server 106, and e-mail server 110 is the e-mail server of device 112. Thus, device 112 processes outgoing e-mail messages in the manner described above with respect to logic flow diagram 300 (FIG. 3), except that the device identifier, digital fingerprint, and encryption key are known to e-mail server 110 and not to e-mail server 106. However, e-mail server 106 can cooperate with e-mail server 110 to verify device 112 as a legitimate sender of an e-mail address to be delivered by e-mail server 106.

It is helpful to consider the illustrative example of an e-mail message sent by device 112 and addressed to device 102B. Since e-mail server 110 is not to deliver the message, e-mail server 110 does not process the e-mail message according to logic flow diagram 500 (FIG. 5) but instead forwards the e-mail message according to the e-mail address of the recipient, e.g., to e-mail server 106.

Upon receipt, e-mail server 106 recognizes that the e-mail message includes a device identifier and also recognizes that the e-mail message does not purport to come from a sender managed by e-mail server 106. Accordingly, e-mail server 106 sends the e-mail message to e-mail server 110 along with a request to verify the sender of the e-mail message. E-mail server 110 verifies the sender in the manner shown in logic flow diagram 500 (FIG. 5) and reports the results of such processing back to e-mail server 106, including the e-mail message in decrypted form. E-mail server 106 and e-mail server 110 preferably communicate with one another in a secure manner.

In this manner, sender verification can be implemented across servers and organizations.

Figure 9:
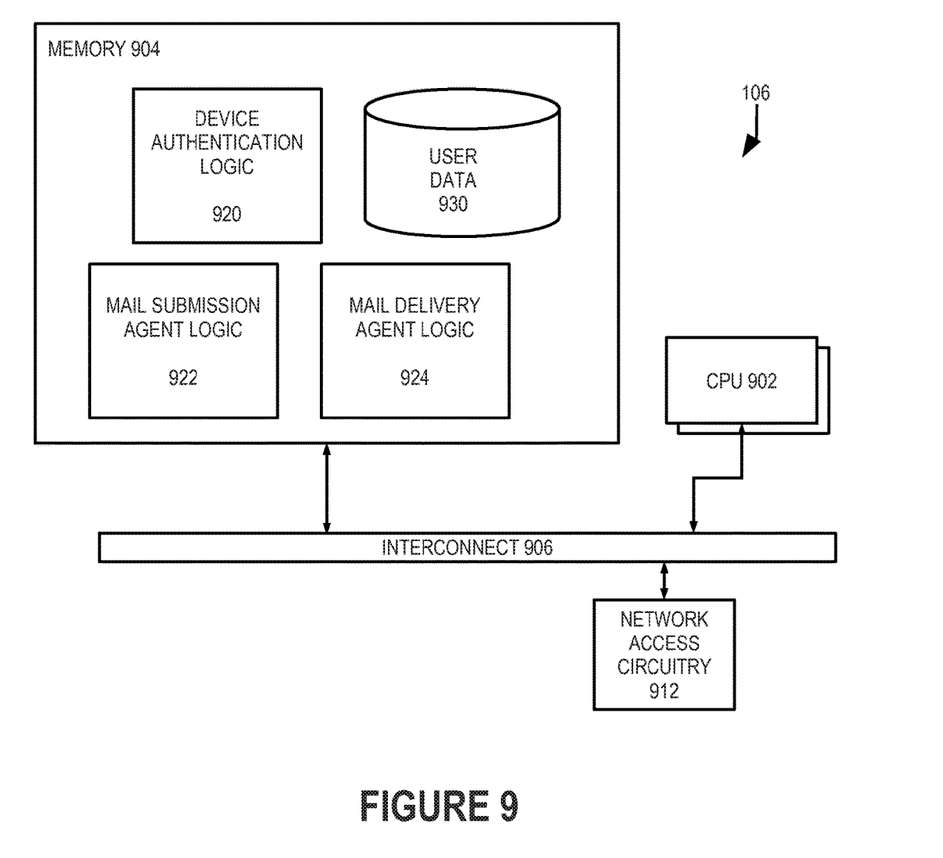
FIG. 9 is a block diagram showing in greater detail the e-mail server of FIG. 1.

E-mail server 106 is shown in greater detail in FIG. 9. E-mail server 106 includes one or more microprocessors 902 (collectively referred to as CPU 902) that retrieve data and/or instructions from memory 904 and execute retrieved instructions in a conventional manner. Memory 904 can include generally any tangible computer-readable medium including, for example, persistent memory such as magnetic and/or optical disks, ROM, and PROM and volatile memory such as RAM.

CPU 902 and memory 904 are connected to one another through a conventional interconnect 906, which is a bus in this illustrative embodiment and which connects CPU 902 and memory 904 to network access circuitry 912. Network access circuitry 912 sends and receives data through computer networks such as wide area network 104 (FIG. 1).

A number of components of e-mail server 106 are stored in memory 904. In particular, device authentication logic 920, mail submission agent logic 922, and mail delivery agent logic 924 are each all or part of one or more computer processes executing within CPU 902 from memory 904 in this illustrative embodiment but can also be implemented using digital logic circuitry.

Mail submission agent logic 922 receives e-mail messages from client devices and forwards those e-mail messages according to SMTP for ultimate delivery by a mail delivery agent such as mail delivery agent logic 924. Mail delivery agent logic 924 delivers e-mail messages to client devices according to a mail delivery protocol such as IMAP (Internet Message Access Protocol) and/or POP3 (Post Office Protocol). Mail delivery agent logic 924 uses device authentication logic 920 to carry out device authentication in the manner described above with respect to logic flow diagram 500 (FIG. 5).

User data 930 (FIG. 9) is data stored persistently in memory 904 and includes known device records such as known device record 700 (FIG. 7) and user records such as user record 800 (FIG. 8) for all devices and users, respectively, that can be authenticated by device authentication logic 920 (FIG. 9). In this illustrative embodiment, known device data 930 is organized as all or part of one or more databases.

Figure 10:
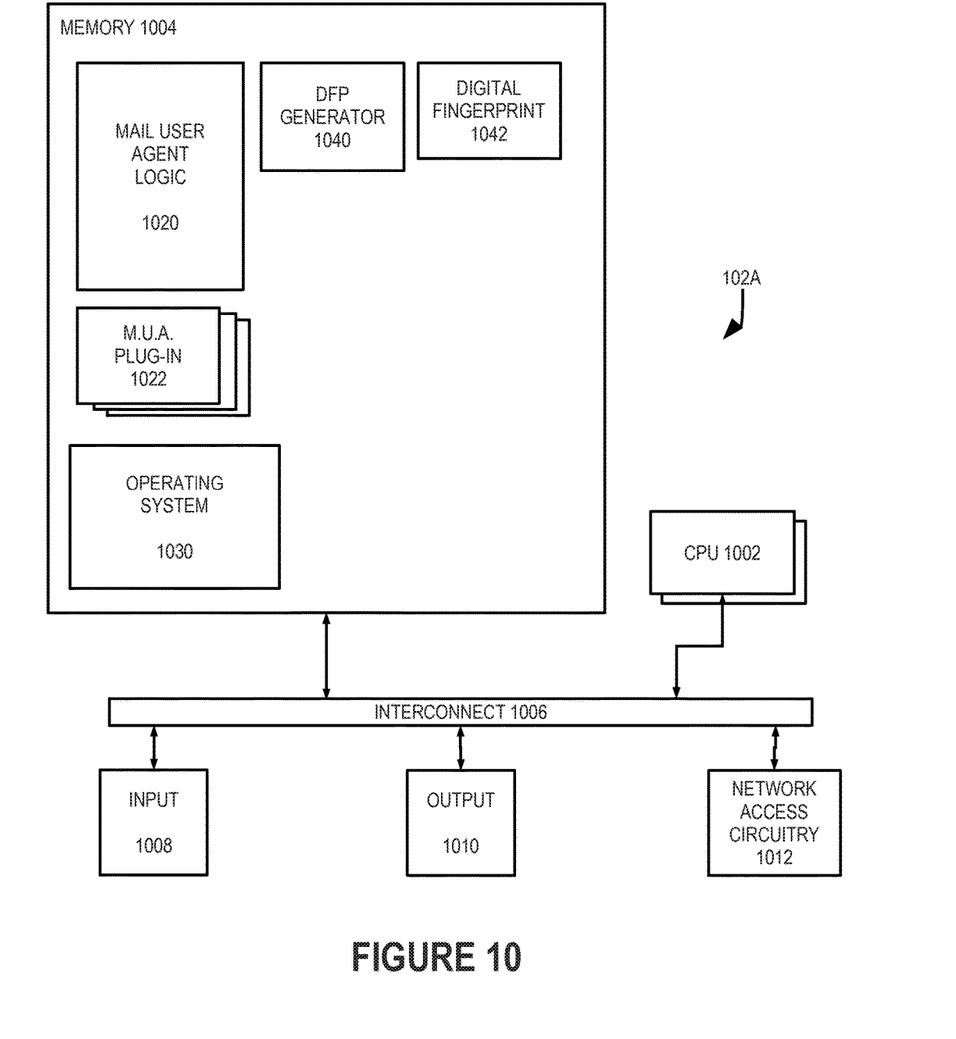
FIG. 10 is a block diagram showing in greater detail the device of FIG. 1.

Device 102A is a personal computing device and is shown in greater detail in FIG. 10. Device 102A includes one or more microprocessors 1002 (collectively referred to as CPU 1002) that retrieve data and/or instructions from memory 1004 and execute retrieved instructions in a conventional manner. Memory 1004 can include generally any computer-readable medium including, for example, persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008, output devices 1010, and network access circuitry 1012. Input devices 1008 can include, for example, a keyboard, a keypad, a touch-sensitive screen, a mouse, a microphone, and one or more cameras. Input devices 1008 detect physical manipulation by a human user and, in response to such physical manipulation, generates signals representative of the physical manipulation and sends the signals to CPU 1002. Output devices 1010 can include, for example, a display—such as a liquid crystal display (LCD)—and one or more loudspeakers. Network access circuitry 1012 sends and receives data through computer networks such as wide area network 104 (FIG. 1).

A number of components of device 102 are stored in memory 1004. In particular, mail user agent logic 1020, operating system 1030, and digital fingerprint generator 1040 are each all or part of one or more computer processes executing within CPU 1002 from memory 1004 in this illustrative embodiment but can also be implemented using digital logic circuitry. As used herein, "logic" refers to (i) logic implemented as computer instructions and/or data within one or more computer processes and/or (ii) logic implemented in electronic circuitry.

Mail user agent plug-ins 1022 are each all or part of one or more computer processes that cooperate with mail user agent logic 1020 to augment the behavior of mail user agent logic 1020. The manner in which behavior of a mail user agent logic is augmented by mail user agent logic plug-ins is conventional and known and is not described herein.

Operating system 1030 is a set of programs that manage computer hardware resources and provide common services for application software such as mail user agent logic 1020, mail user agent plug-ins 1022, and digital fingerprint generator 1040.

Digital fingerprint 1042 is data stored persistently in memory 1004 and represents the digital fingerprint of device 102B and can include an encryption key used to facilitate authentication of device 102B in the manner described above. Such authentication can be carried out by digital fingerprint generator 1042 or by one or more mail user agent plug-ins 1022 or by cooperation between both digital fingerprint generator 1042 and one or more mail user agent plug-ins 1022.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for verifying a purported sender of an e-mail message, the method comprising:
   retrieving an encryption key associated with a device from which the e-mail message originated;
   attempting decryption of one or more components of the e-mail message using the encryption key;
   determining that the decryption fails;
   in response to determining that the decryption fails, disarming but not deleting the e-mail message to form a disarmed e-mail message;
   delivering the disarmed e-mail message in place of the e-mail message;
   parsing a transaction identifier from the e-mail message, wherein the transaction identifier identifies a mail submission transaction by which the e-mail message was submitted; and
   comparing the transaction identifier to one or more previously stored transaction identifiers associated with the purported sender of the e-mail.

2. The method of claim 1 wherein the encryption key is derived from a digital fingerprint of the device.

3. The method of claim 1 further comprising:
parsing an identifier of the device from the e-mail message; and
wherein retrieving the encryption key associated with the device includes using the identifier.

4. The method of claim 1 wherein disarming the e-mail message comprises:
stripping one or more attachments from the e-mail message.

5. A non-transitory tangible computer readable medium useful in association with a computer that includes one or more processors and a memory, the non-transitory computer readable medium including computer instructions that are configured to cause the computer, by execution of the computer instructions in the one or more processors from the memory, to verify a purported sender of an e-mail message by at least:
retrieving an encryption key associated with a device from which the e-mail message originated;
attempting decryption of one or more components of the e-mail message using the encryption key;
determining that the decryption fails;
in response to determining that the decryption fails, disarming but not deleting the e-mail message to form a disarmed e-mail message;
delivering the disarmed e-mail message in place of the e-mail message;
parsing a transaction identifier from the e-mail message, wherein the transaction identifier identifies a mail submission transaction by which the e-mail message was submitted; and
comparing the transaction identifier to one or more previously stored transaction identifiers associated with the purported sender of the e-mail.

6. The computer readable medium of claim 5 wherein the encryption key is derived from a digital fingerprint of the device.

7. The computer readable medium of claim 5 wherein the computer instructions are configured to cause the computer to verify a purported sender of an e-mail message by at least also:
parsing an identifier of the device from the e-mail message; and
wherein retrieving the encryption key associated with the device includes using the identifier.

8. The computer readable medium of claim 5 wherein disarming the e-mail message comprises:
stripping one or more attachments from the e-mail message.

9. A computer system comprising:
at least one processor;
a computer readable medium that is operatively coupled to the processor;
network access circuitry that is operatively coupled to the processor; and
sender verification logic (i) that executes at least in part in the processor from the computer readable medium and (ii) that, when executed, causes the processor to verify a purported sender of an e-mail message by at least:
retrieving an encryption key associated with a device from which the e-mail message originated;
attempting decryption of one or more components of the e-mail message using the encryption key;
determining that the decryption fails;
in response to determining that the decryption fails, disarming but not deleting the e-mail message to form a disarmed e-mail message;
delivering the disarmed e-mail message in place of the e-mail message;
parsing a transaction identifier from the e-mail message, wherein the transaction identifier identifies a mail submission transaction by which the e-mail message was submitted; and
comparing the transaction identifier to one or more previously stored transaction identifiers associated with the purported sender of the e-mail.

10. The computer system of claim 9 wherein the encryption key is derived from a digital fingerprint of the device.

11. The computer system of claim 9 wherein the sender verification logic causes the processor to verify a purported sender of an e-mail message by at least also:
parsing an identifier of the device from the e-mail message; and
wherein retrieving the encryption key associated with the device includes using the identifier.

12. The computer system of claim 9 wherein disarming the e-mail message comprises:
stripping one or more attachments from the e-mail message.

* * * * *